(No Model.)
D. B. ADAMS.
VARIABLE NOZZLE.
No. 590,534. Patented Sept. 21, 1897.
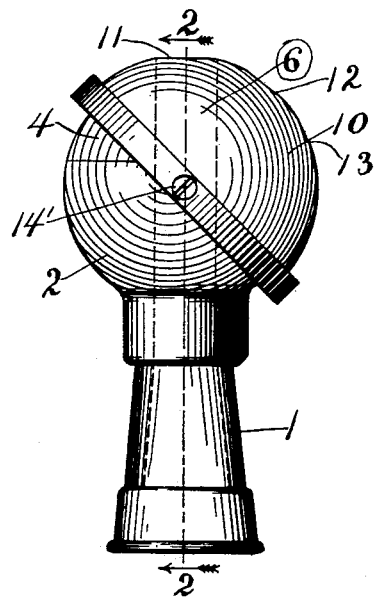
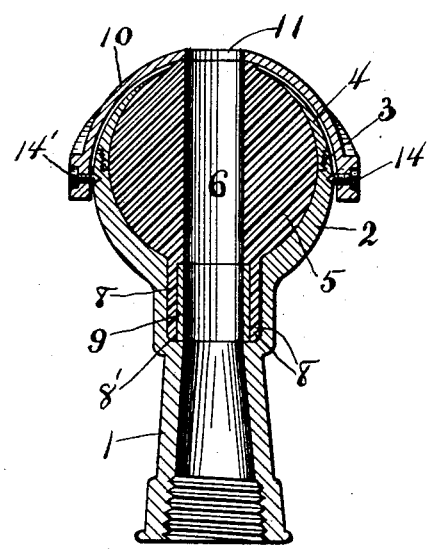
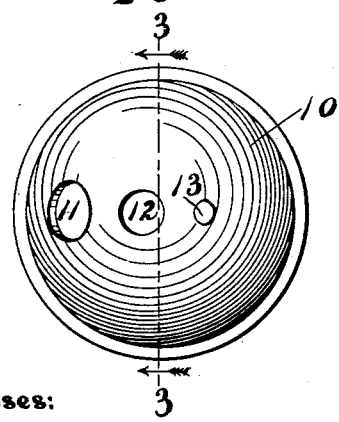
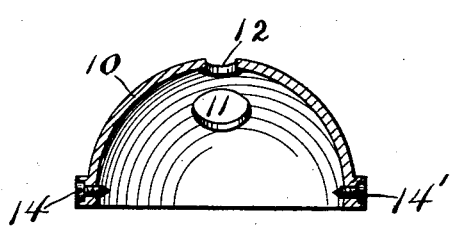
Witnesses:
E. J. Acker.
H. C. Hunsberger.
Inventor.
Don B. Adams
By B. Singer Att'y.

UNITED STATES PATENT OFFICE.

DON B. ADAMS, OF CHICAGO, ILLINOIS, ASSIGNOR TO THE GLOBE NOZZLE COMPANY, OF CHARLESTON, WEST VIRGINIA.

VARIABLE NOZZLE.

SPECIFICATION forming part of Letters Patent No. 590,534, dated September 21, 1897.

Application filed April 3, 1897. Serial No. 630,664. (No model.)

*To all whom it may concern:*

Be it known that I, DON B. ADAMS, a citizen of the United States, residing at Chicago, county of Cook, State of Illinois, have invented a new and useful Improvement in Nozzles, of which the following is a specification.

My invention has for its objects the discharging by means of a cap over its orifice through either of several outlets at will or of spraying, if desired, at the will of the operator.

In my application for a patent filed May 19, 1896, Serial No. 592,213, the method of construction of my device was fully specified, and while I herein follow in the main the same method of construction I desire to include in this specification, while not relinquishing any of the claims in said application, a variation regarding the cap on the nozzle and its construction.

In the accompanying drawings, Figure 1 is a front elevation of the nozzle. Fig. 2 is a longitudinal section on line 2, Fig. 1. Fig. 3 is a top view; and Fig. 4 is a partial section on line 3, Fig. 3.

Similar numerals refer to similar parts throughout the drawings.

A discharge-pipe terminal 1, of brass or other metal, has a hollow semiglobular end 2, provided with screw-threads 3, whereby it may be connected with a similarly-shaped part 4, having also screw-threads to make the connection. Within the hollow globe thus formed is placed a solid tubular sphere 5, of rubber, having a passage 6 on a line and continuous with that of the discharge-pipe. A tubular extension 8 of the solid rubber sphere fits a seat 8' in the pipe and is held therein by a retaining-ring 9, which may be split and extensible, if desired. A hollow hemisphere or cap 10 fits the hemisphere-ring 4 and is provided with circular openings 11, 12, and 13, Fig. 3, the number of which may be varied.

The hollow hemisphere or cap 10 is pivoted at its base on the two pins 14 14', which enter a shallow socket in the hollow globe 2 and on which the hemisphere or cap 10 can be partially rotated, so as to bring the openings 11, 12, and 13 over the line of the discharge-pipe. The pressure of the water in the passage 6 will cause the rubber to pack against the joint between the rubber sphere 5 and the hollow globe 2 to prevent leakage at any part. When the imperforated portion of the cap 10 is over the orifice, the discharge-passage 6 is closed and the water is shut off. The orifice of the rubber passage 6 is arranged so that it packs the joint between it and the cap 10, so that no leakage occurs when the discharge is cut off.

The nozzle is coupled with the hose or pipe by means of a screw-threaded socket 17, and as the perforations in the cap 10 are of different sizes the device enables the operator to vary the size of discharging streams at will.

Having thus described my invention, what I now claim as new, and desire to protect by Letters Patent, is—

1. In a variable nozzle the combination of a solid rubber sphere having a discharge-passage through its center, inclosed in an approximately spherical end, surmounted by a hemispherical cap having several perforations of different sizes, the cap pivoted on two pins at its base permitting it to partially rotate to expose either of the perforations to the line of discharge or to cut off at will as and for the purpose above specified.

2. In a variable nozzle the combination of a hollow globular end surmounted by a hemispherical cap variously perforated for discharge-orifices of different size pivoted on two pins, said globular end inclosing a solid sphere of rubber with a discharge-passage through its center forming an automatic packing against the cap and the walls and joints of the globular end, and pipe end, the exits of the nozzle opened and closed by means of the partial rotation of the cap as and for the purpose specified.

DON B. ADAMS.

Witnesses:
  H. C. HUNSBERGER,
  J. I. KAFFERD.